Jan. 10, 1933.    G. A. PARTEN    1,893,958
CARVING MACHINE STRUCTURE
Filed Aug. 11, 1928    3 Sheets-Sheet 3

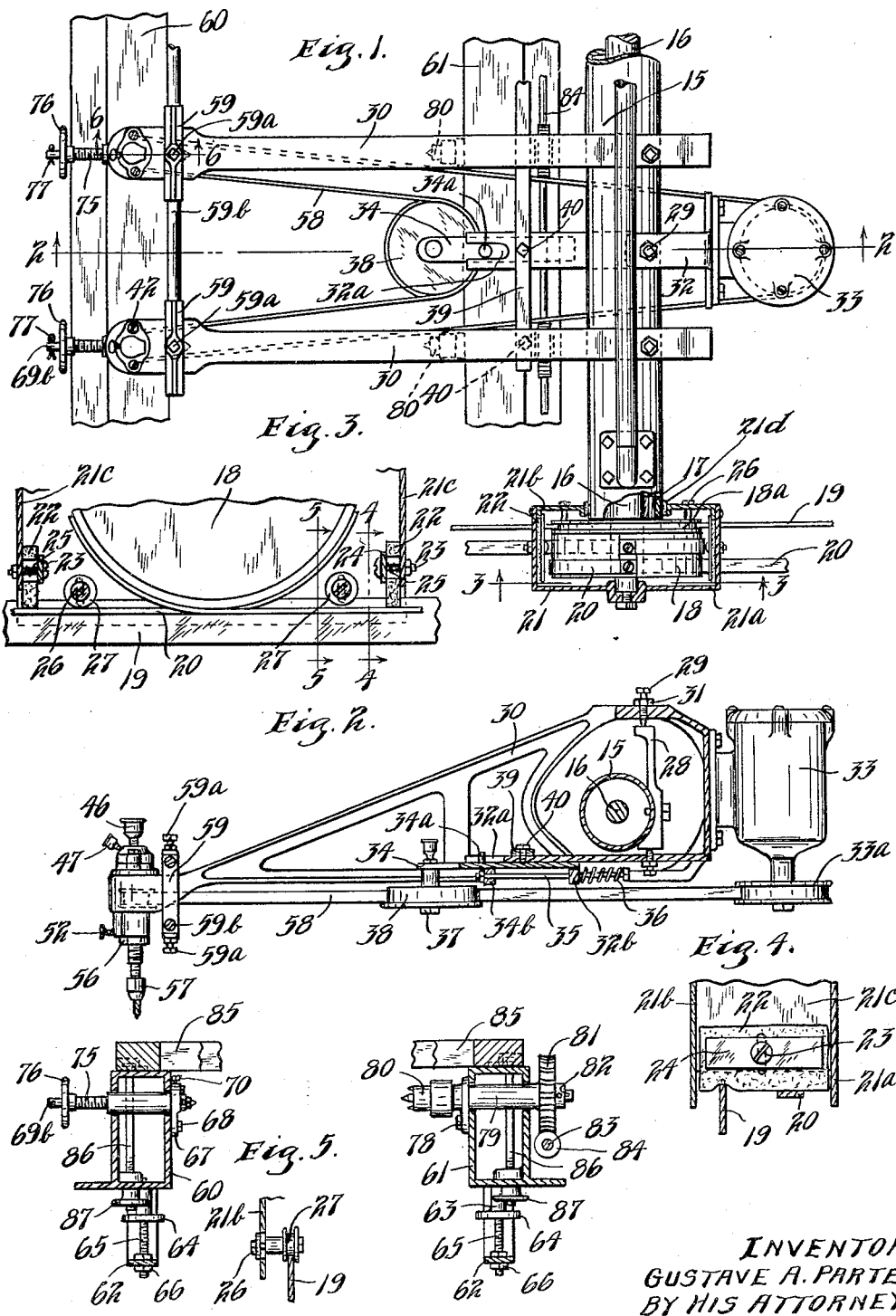

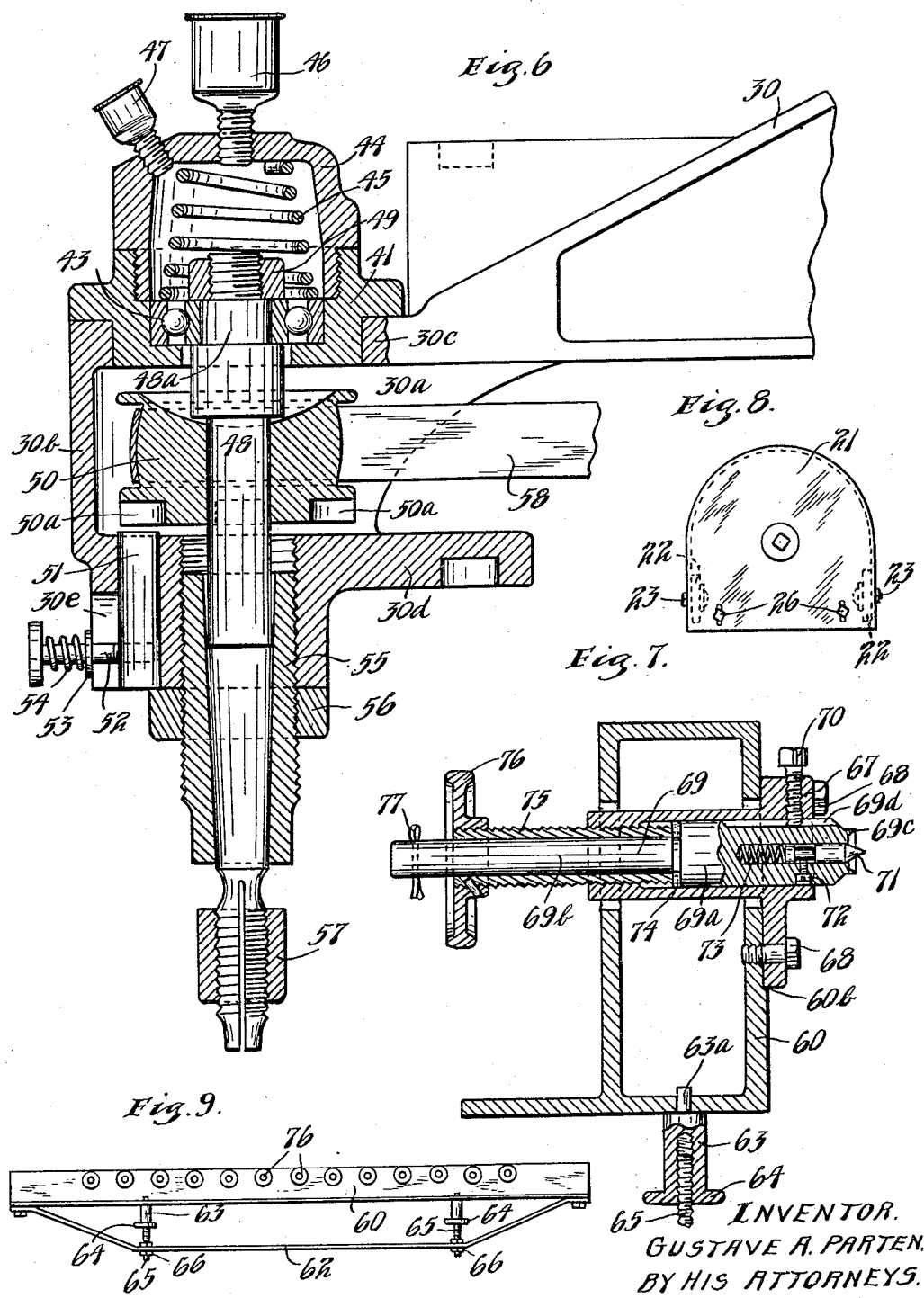

INVENTOR.
GUSTAVE A. PARTEN.
BY HIS ATTORNEYS.

Patented Jan. 10, 1933

1,893,958

UNITED STATES PATENT OFFICE

GUSTAVE A. PARTEN, OF MINNEAPOLIS, MINNESOTA

CARVING MACHINE STRUCTURE

Application filed August 11, 1928. Serial No. 298,902.

This invention relates to a carving machine, and particularly to a carving machine for carving wood or similar materials, and in which a plurality of articles are simultaneously carved. In such a machine a plurality of cutting tools are used which are moved in unison, being controlled by a tracer or master tool similarly moved and which is moved over the pattern having the desired contour of the articles to be carved. The machine is adapted to cut either flat work or round work.

It is an object of this invention, therefore, to provide a carving machine having a plurality of swinging arms, in each of which a tool spindle is mounted, which mounting comprises a novel and efficient structure.

It is a further object of the invention to provide a carving machine having tool spindles mounted in swinging arms, with simple and efficient means for locking said spindle against rotation.

It is a further object of the invention to provide a carving machine having a center or work gripping member with means for moving the same into engagement with the work, so constructed and arranged that the center may be struck and moved into firm engagement with the work.

It is still another object of the invention to provide a carving machine having a tool carrying member movable forwardly and rearwardly thereon, having wheels movable on rails with an enclosing means for said wheels, and means for cleaning said rails and the parts connected to said wheel.

These and other objects and advantages of the invention will be fully set forth in the following description made in connection with the accompanying drawings, in which like reference characters refer to similar parts throughout the several views and in which:—

Fig. 1 is a plan view of a portion of the machine;

Fig. 2 is a vertical section on line 2—2 of Fig. 1, as indicated by the arrows;

Fig. 3 is a vertical section on line 3—3 of Fig. 1, as indicated by the arrows;

Fig. 4 is a vertical section on line 4—4 of Fig. 3, as indicated by the arrows;

Fig. 5 is a vertical section on line 5—5 of Fig. 3, as indicated by the arrows;

Fig. 6 is a vertical section on line 6—6 of Fig. 1, as indicated by the arrow, shown on an enlarged scale;

Fig. 7 is a partial vertical section as shown in the lower part of Fig. 2, shown on an enlarged scale.

Fig. 8 is a view in end elevation of the track roller housing of the device shown in Fig. 1; and Fig. 9 is a view in front elevation of the center carrying means.

Figure 10:
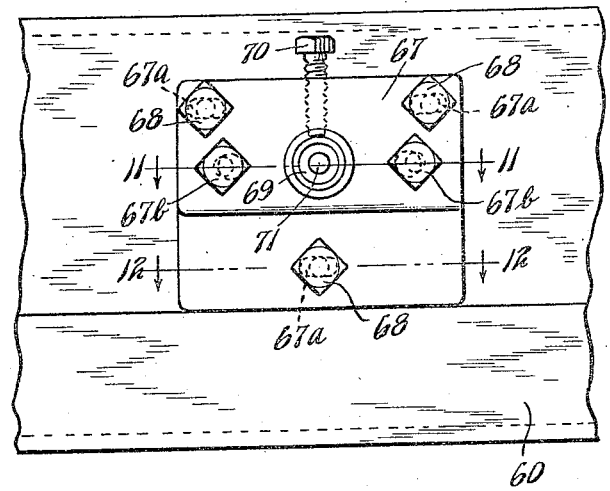
Fig. 10 is a partial view in front elevation as seen from the right of Fig. 7.
Figure 11:
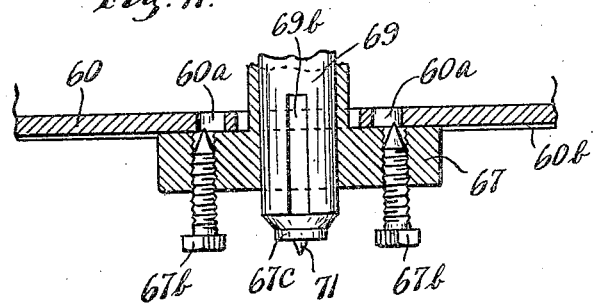
Fig. 11 is a horizontal section taken on line 11—11 of Fig. 10 as indicated by the arrows.
Figure 12:
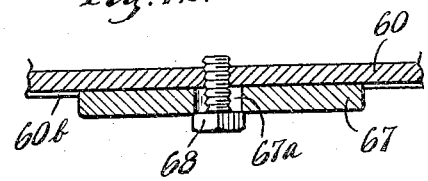
Fig. 12 is a horizontal section taken on line 12—12 of Fig. 10 as indicated by the arrows.

Referring to the drawings, a carving machine is shown, of the general type disclosed in applicant's co-pending application S. N. 264,650, filed March 26, 1928, in which it will only be necessary to consider the member 15 in the form of a tube which extends longitudinally of the machine and is journaled on another member 16 extending therethrough, ball bearings 17 being provided between said members. The member 16 is secured at its end to wheels 18 having grooved portions 18$a$ which run on rails 19 supported on the frame and extending transversely thereof at its ends. The wheel 18 has a rather wide periphery to which are secured the ends of flexible straps 20 extending partially around the wheel and in opposite directions, the other ends of said straps being secured to the frame. As the wheel rolls on rail 19, straps 20 wind up and unwind respectively on said wheel. A casing 21 is provided, comprising an outer portion 21$a$ having a semi-cylindrical top and vertical sides, which encloses the wheel 18, and having a rear plate 21$b$ of similar shape having an inwardly extending flange over which portion 21$a$ fits and to which it is secured. The front wall of portion 21$a$ and the portion 21$b$ extend some distance below the top of rail 19, while the side portions 21$c$ of the casing terminate some distance above the rail. Said side portions have secured to the inner sides thereof yielding fibrous pads 22 of felt or similar material, having slots through which extend headed and nutted bolts 23 which also extend through narrow plates 24 at the inner side of said pads and through holes in the sides 21c, whereby said pads are clamped to the sides 21c. Coiled compression springs 25 surround the bolts 23 between plates 24 and sides 21c, to prevent rattling. The casing portion 21b also has studs 26 secured thereto, on which are journaled small rollers 27 running on top of the rail 19. As shown in Fig. 4, the pads 22 engage the top of rail 19 and the top surfaces of straps 20. A cylindrical flanged washer 21d of fabric material is disposed between portion 21b of member 21 and member 15.

The member 15 has brackets 28 secured at its rear side, having small pointed holes in its top and bottom surface engaged by screws 29 respectively secured to the top and bottom portion of arms 30 which extend forwardly from member 15, said screws 29 being equipped with lock nuts 31. As shown in Fig. 2, the arms have quite a large opening through which member 15 extends. An arm 32 is also secured to one of the brackets 28 by screws 29, in a manner similar to the arms 30, which arm has at its rear end a flat portion to which is bolted a driving motor 33 having a flanged pulley 33a secured to the armature shaft thereof. The arm 32 has a slot 32a at its forward end, in which travels a pin 34a upstanding from a slide 34 moving immediately beneath arm 32 in engagement therewith and having a downwardly extending lug 34b through which extends a rod 35 having a nut thereon engaging the front end of lug 34b and extending rearwardly through a lug 32b on the arm 32, said rod having a head at its rear end and being surrounded by a coiled spring 36 bearing against said head and the lug 32b. The slide 34 has a stud 37 depending from its forward end, on which is journaled a flanged pulley 38. It will be seen that spring 36 exerts pressure on slide 34 to move the same and pulley 38 rearwardly. Bracket 32 is connected to one of the arms 30 by a link 39 pivotally connected to both brackets by suitable screws 40.

The forward end of arms 30 each have a recess 30a therein, closed by the front portion 30b of said arms and having portions 30c and 30d at the top and bottom of said recess. The portion 30c is bored to receive the lower cylindrical portion of a cap member 41 having a flange bolted at each side to the arm by the screws 42. The cap 41 has an internal bore in which is seated the ball bearing casing 43 and said cap is interiorly threaded to receive the lower portion of an upper cap 44 which is hollow and encloses a coiled compression spring 45, one end of which bears against the top of cap 44 and the lower end of which bears against the top of the ball bearing race 43. A grease cup 46 is mounted in the top of cap 44 and an oil cup 47 is mounted in the forward portion of said cap. The inner portion of the race 43 is secured to the upper portion 48a of a tool carrying spindle 48, said spindle having a reduced threaded portion above the portion 48a which is equipped with a nut 49 seated on the top of the race 43. Said spindle has an enlarged portion below the portion 48a forming a shoulder against which the race 43 engages. A pulley 50, having top and bottom flanges, is disposed in the recess 30a and secured to the spindle 48. Said pulley has circumferentially spaced notches or recesses 50a in its bottom surface, any one of which may be engaged by an upwardly movable pin 51 slidable in a bore in the portion 30d. A slot 30e extends from the lower portion of the bore receiving pin 51 to the front of the arm 30, and a headed pin 52 is secured in the pin 51 and projects forwardly through said slot. A washer 53 slidable on pin 52 engages the front of the arm 30 at each side of said slot, and is moved into engagement therewith by a compression coiled spring 54 engaging washer 53 and the head of pin 52. Portion 30d is bored and threaded to receive an adjustable bushing 55 held in adjusted position by a lock nut 56 threaded thereon and engaging the lower side of portion 30d, this lock nut forming a stop limiting the downward movement of pin 51. Bushing 55 has a tapered bore in which the lower tapered portion of the spindle 48 is journaled, said spindle projecting below bushing 55 and having a lower split tapered portion which is threaded to receive a nut 57 whereby a tool may be clamped in the spindle 48. A belt 58 extends around pulley 33a thence forwardly around adjacent pulleys 50 in the arms 30, and then rearwardly over the pulley 38. Arms 30 are connected by yokes 59 pivoted thereto by screws 59a at the top and bottom of said yokes, and said yokes are connected by sleeves 59b.

The machine comprises longitudinally extending beams 60 and 61, which beams are shown as of hollow form, rectangular in cross section. Both beams 60 and 61 have secured to their ends at the under side thereof, the ends of a truss bar 62. This bar extends downwardly in an inclined direction adjacent its ends and has its intermediate portion extending parallel to the beams 60 and 61 respectively. A nut forming member 63 has a reduced portion 63a extending into the bottom of its beam and said member has a turning hand wheel 64 thereon. Member 63 engages with the screw 65 held in the bar 62 by the lock nuts 66 disposed respectively at each side of said bar. Each bar 62 has one of the screws 65 adjacent the ends of the portion parallel to the beams 60 and 61 respectively. The members 62 form trusses, strengthening said beams and preventing sagging movement thereof. The beam 60 has secured therein by the bolt 68 a plurality of bearing members 67. Each member 67 is bored at its forward end to receive the cylindrical and forward end 69a of a center carrying and work gripping member 69. Member 69a has a groove 69d at its top portion, engaged by the inner end of a set screw 70 which thus prevents rotative movement of said member 69. Member 69 has at its forward end annularly disposed teeth 69c adapted to enter and grip the work. The forward end of portion 69a is bored to receive a center 71 having an intermediate reduced portion into which extends the inner end of a screw 72 countersunk into the member 69. Said center is urged forwardly by a coiled compression spring 73 in the rear thereof and disposed in the bore receiving the center 71. Member 69 has a reduced rear portion 69b forming a shoulder portion, and a washer 74 engages this shoulder. The rear portion of bearing 67 is threaded and receives an exteriorly threaded sleeve 75 in which portion 69b is journaled, said sleeve having a hand wheel 76 secured to its rear end. The portion 69b projects rearwardly beyond wheel 76 and has a stop means secured thereto, shown as a cotter pin 77. The member 69 and its spring seated center 71 constitute a tail stock for the wood or other material to be carved and each of said tail stocks must have its center on the same level and truly aligned with the corresponding live center 80 carried by the rear beam 61. The bolts 68 therefore, extend through slots 67a in the flange of member 67 so that the shifting movement of said member is permitted. Said member 67 also has threaded thereinto a pair of pointed set screws 67b which aline partially with holes 60a formed in the beam 60. The inclined sides of the points on the screws 67b engage the remote sides of the holes 60a respectively. It will thus be seen that if one of the screws 67b be moved inwardly, it will cam against the edge of the holes 60a and move the bearing member 67 towards the other screw and vice versa. When the member 67 is thus finely adjusted, screws 68 are tightened and it is held in its adjusted position. The members 67 are also seated against a finished surface or shoulder 60b formed on the front of the beam 60. With the described structure it will be seen that member 69 can be moved forwardly longitudinally the distance between member 77 and wheel 76.

The rear beam 61 has secured thereto by the bolts 78 a plurality of bearing members 79 axially alined with the bearing members 67, and live work gripping and centering members 80 are journaled in the bearings 79 and have secured to the rear ends worm wheels 81. The worm wheels 81 are secured on members 80 by the pinned collars 82. The worm wheels 81 are engaged by worm gears 83 secured to a common shaft 84 extending longitudinally of the machine, so that all of the centers may be simultaneously moved. A work table 85 is supported on top of the beams 60 and 61 and clamped in place by bolts 86 extending through said beams and having tightening hand wheels 87 threaded onto their lower ends.

In operation the motors 33 are driven, thus through belts 58 driving pulleys 50 and spindles 48. The arms 30 swing about the axes of screws 29. One of the arms 30 will carry a master or tracer tool and the other arms 30 will be equipped with cutting tools. The operator holds the arm carrying the tracer and moves the same over a pattern. The arm are easily moved forwardly and rearwardly, wheels 18 rolling on the rails 19 and the arms are also moved very easily vertically, tube 15 oscillating about its axis on bearings 17. The arms 30 swing in unison and follow the movements of the tracer so that the work is cut to the desired form. The work is supported either in the centering and work gripping members 69 and 80, as when round work is being done, or is clamped upon the table 85 as when flat work is being done. It is often desired to hold the spindle 48 stationary while a tool is removed. When this is to be done, the operator lifts up on the head of pin 52 and slides pin 51 upwardly until it engages in one of the notches 50a. The pulley and spindle are then held against rotation. The pin 52 can be later depressed and rotation of said pulley and spindle permitted. The spindle is securely and firmly held in place in the arm by the structure described. The bearing 43 is held firmly in position and the spindle is held tight vertically in said bearing.

Difficulty has heretofore been experienced in securing the necessary grip on the ends of the work when the work is held in the centering and gripping members. In the structure of member 69, the work can be placed so as to be held longitudinally in the members 80 and member 69 then moved into engagement with the work by turning the hand wheel 76. When the teeth 69c have engaged the work, the operator can then strike the rear end of portion 69b with a hammer or other tool and seat the front end of the member 69 firmly in the work. This movement is permitted by the space between members 76 and 77. After member 69 is so seated in the work, the operator can again turn the wheel 76 and bring the sleeve 75 into engagement with the collars 74 so that member 69 will be held up to the work.

It is quite necessary to keep the rails 19 and straps 20 clean, so that wheel 18 is not raised, which would cause inaccuracy in the work. The wheel is thus enclosed in the casing 21 and kept free from dust chips and other dirt are kept off from the rails 19 and straps 20 by the pads 22. In commercial wood carving machines of this type it is customary to provide a large number of carving-tool spindles and corresponding arms mounted for oscillating motion in the vertical plane and lateral swinging motion in the horizontal plane, and also to employ a correspondingly large number of live centers and tail stocks for supporting and turning the work to be carved. It is quite common for such commercial machines to have as many as sixteen or even twenty-four spindles and corresponding sets of live centers and tail stocks.

The said centers and their mountings are usually made of steel to secure the requisite strength and when a large plurality of the same are employed the aggregate weight thereof is large. Hence, the said tail stocks and live centers are carried in rigid beams. One beam carries all the tail stocks and another beam carries all the live centers. These beams are parallel with each other, extend entirely across the machine and stand on a common level. The centers of the tail stocks and the live centers must be truly aligned at a common level or otherwise the carving tools cannot be made to operate properly on the wood or other material carried by the said centers and turned by the live members thereof. These beams, therefore, must not be permitted to sag under the load of said centers and their mountings carried thereby. It is for this reason that the truss bars 62 are applied to the said beams 60 and 61 and applied by means which make the trusses adjustable in tension. With these trusses so applied the said beams and the cooperating centers carried thereby can always be kept truly aligned at a common level.

From the above description it is seen that applicant has provided a carving machine having a greatly improved structure which is quite simple and efficient. The machine is strong, durable and compact and easily and quickly operated. The same has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A carving machine having in combination, an arm having a recess in its forward end with portions above and below the same, said recess being open at its rear side, the upper portion being bored to receive a cap, means securing said cap to said arm, a bearing secured in said cap, a spindle journaled in said bearing extending through said recess, and journaled in the portion below the same, a pulley secured to said spindle, a belt for said pulley extending through the open rear side of said recess, the bore receiving said cap being of larger diameter than said pulley, whereby said pulley and spindle may be removed therethrough when said cap is removed.

2. A carving machine having in combination, an arm having a recess in its forward end with portions above and below said recess, the upper portion having a bore therein, a cap fitted in said bore and secured to said arm, a ball bearing seated in the bottom of said cap, a hollow cap secured to said first mentioned cap, a spring in said latter cap bearing against the top thereof and against said ball bearing, a spindle carried in said ball bearing and prevented from rising thereby, and a bushing in the portion of said arm below said recess in which said spindle is also journaled, said spindle having a nut thereon above said first ball bearing.

3. A carving machine having in combination, an arm having a recess in its forward end with portions above and below said recess, a bushing in the portion below said recess, a spindle journaled in said bushing, a lock nut holding said bushing in position, a pulley disposed in said recess and secured to said spindle, a member slidable in the portion below said recess, said pulley having recesses into which said member is movable, said nut forming a stop limiting the downward movement of said member, and friction means engaging said arm for holding said member in the position in which it is moved.

4. A carving machine having in combination, an arm having a recess at its forward portion, a spindle journaled in said arm and extending across said recess, a pulley disposed in said recess and secured to said spindle, a pin vertically movable in said arm, said pulley having recesses into which said pin is movable, a slot extending from said pin to the front portion of said arm, a headed pin secured in said pin having a washer movable thereon, and a spring disposed between the head of said headed pin and said washer, holding said washer against said arm to hold said first mentioned pin in adjusted position.

5. A carving machine having in combination, a frame, a tool carrying member extending longitudinally thereof, a track including a rail extending transversely of said frame adjacent the end thereof, a wheel carrying said member movable on said rail, a casing mounted on the ends of said member enclosing said wheel and movable with said member and wheel along said rail.

6. The structure set forth in claim 5, said casing having wheels carried thereby movable on said rail.

7. The structure set forth in claim 5, said casing having yielding fibrous means secured thereto engaging said rail in the movement of said wheel and casing to wipe and clean said rail.

8. A carving machine having in combination, a frame, a tool carrying member extending longitudinally thereof, a track including a rail extending transversely of said frame, adjacent the end thereof, a wheel carrying said member movable on said rail, a flexible strap extending about said wheel and adapted to roll up thereon, a casing carried by said member and enclosing said wheel, and yielding fabric means carried by said casing engaging said strap to wipe and clean the same.

9. A carving machine having in combination, a frame, a tool carrying member extending longitudinally thereof, a track including a rail extending transversely of said frame adjacent the end thereof, a wheel carrying said member movable on said rail, a flexible strap secured to said wheel and adapted to roll up thereon, a casing enclosing said wheel and embracing said member, means on said casing movable on said rail, and means carried by said casing for wiping said rail and straps.

10. The structure set forth in claim 9, and fabric means between said casing and member.

11. A carving machine having in combination, a frame, a tool carrying member extending longitudinally thereof, a track including a rail extending transversely of said frame adjacent the end thereof, a wheel carrying said member movable on said rail, a casing enclosing said wheel movable with said wheel and member, and having cleaning means engaging said rail.

12. A carving machine having in combination, a frame, a member extending longitudinally of the frame, bearings secured in said member and extending transversely thereof, a center carrying work gripping member mounted in each of said bearings and longitudinally movable therein, said members having reduced portions at their rear ends forming shoulders on said members, a threaded sleeve surrounding said reduced portion threaded into said bearing, means for moving the same to engage said shoulder and move said member forwardly, said reduced portion extending rearwardly beyond said means whereby when said member has been moved into engagement with the work, said rear portion may be struck and said member forced into the work.

13. The structure set forth in claim 12, and means adjacent the rear end of said reduced portion engageable by said last mentioned means for retracting said member.

14. A carving machine having in combination, a frame, a member extending longitudinally thereof, bearings secured in said member and extending transversely thereof, having a bore therein, a member fitted in said bore having work gripping means at its forward end, a center mounted in the forward end of said member for limited sliding movement, yielding means in said member urging said center forwardly, means holding said member against rotation in said bearing, but permitting longitudinal movement thereof in said bearings, said member having a reduced portion extending rearwardly and forming a shoulder thereon, a sleeve surrounding said reduced portion and threaded into the rear end of said bearing, means secured to said sleeve for turning the same and moving said member forwardly in said bearing, said reduced portion extending beyond said last mentioned means, whereby said member can be moved into engagement with the work and the rear end then struck to move the same into the work.

15. The structure set forth in claim 14, said reduced portion having a stop adjacent its rear end engageable by said last mentioned means for retracting said member.

In testimony whereof I affix my signature.

GUSTAVE A. PARTEN.